US008489648B1

(12) United States Patent
Rubin (10) Patent No.: US 8,489,648 B1
(45) Date of Patent: Jul. 16, 2013

(54) SYSTEM OF SYSTEMS AND METHOD FOR SOFTWARE COMPONENT SYSTEM DESIGN AND OPTIMIZATION THROUGH TESTING

(75) Inventor: Stuart Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 204 days.

(21) Appl. No.: 13/005,670

(22) Filed: Jan. 13, 2011

(51) Int. Cl.
  *G06F 17/30* (2006.01)
  *G06F 17/50* (2006.01)

(52) U.S. Cl.
  USPC .......................................... 707/802; 716/106

(58) Field of Classification Search
  None
  See application file for complete search history.

(56) References Cited

U.S. PATENT DOCUMENTS

| | | | |
|---|---|---|---|
| 7,047,226 B2 | 5/2006 | Rubin | |
| 2002/0174084 A1* | 11/2002 | Mitsugi | 707/1 |
| 2004/0210596 A1* | 10/2004 | Budd et al. | 707/102 |
| 2007/0203923 A1* | 8/2007 | Thomas | 707/100 |
| 2009/0216820 A1* | 8/2009 | Eusterbrock | 708/270 |
| 2010/0063799 A1* | 3/2010 | Jamieson | 704/9 |
| 2010/0070448 A1* | 3/2010 | Omoigui | 706/47 |
| 2011/0265020 A1* | 10/2011 | Fields et al. | 715/760 |
| 2012/0149000 A1* | 6/2012 | Baker et al. | 434/362 |

OTHER PUBLICATIONS

"CASE Computer Aided Software Engineering PoepleBokk" dated 1996.*

G.J. Chaitin, "Randomness and Mathematical Proof," Scientific American, vol. 232, No. 5, pp. 47-52, 1975.

S.H. Rubin, S.N.J. Murthy, M.H. Smith, and L. Trajkovic, "KASER: Knowledge Amplification by Structured Expert Randomization," IEEE Transactions on Systems, Man, and Cybernetics—Part B: Cybernetics, vol. 34, No. 6, pp. 2317-2329, 2004.

S.H. Rubin, G. Lee, W. Pedrycz, and S.C. Chen, "Modeling Human Cognition Using a Transformational Knowledge Architecture", Proc. of the IEEE Intl. Conference on System of Systems Engineering (SoSE), Monterey, CA, 2008, IEEE 978-1-4244-2173-2.

Q.A. Liang and S.H. Rubin, Randomization in searching for composites of software components, Proc. 2007 IEEE International Conference on Information Reuse and Integration (IRI), Las Vegas, NV, Aug. 11-13, 2007, pp. 42-48.

Q. Liang and S.H. Rubin, Randomization in designing software tests for systems of systems, Int. J. Information and Decision Sciences, to appear 2011.

* cited by examiner

Primary Examiner — Tarek Chbouki
(74) Attorney, Agent, or Firm — Kyle Eppele; Stephen E. Baldwin (57) ABSTRACT

In one embodiment, the present invention is a computer-implemented system for designing software-based components for systems of systems including multiple software-based components saved in a relational database where the functions of each software component are defined by one or more examples of its operation using a natural language. Each software component is assigned a searchable, unique free-text field such that each of the components have multiple indexed levels in a literal restriction path. The system further includes means for retrieval, synthesis, substitution, reuse and modification of the components at every level of the multiple levels, including means for defining a new software component.

15 Claims, 6 Drawing Sheets

```
((DEFUN MYSORT (S)
  (COND ((NULL S) NIL)
    (T (CONS (MYMIN S (CAR S)) (MYSORT (REMOVE
(MYMIN S (CAR S)) S))))))
? io
(((((1 3 2)) (1 2 3)) (((3 2 1)) (1 2 3)) (((1 2 3)) (1 2 3)))
? (pprint (setq frepos '((CRISPY '
      (DEFUN MYSORT (S)
        (COND
         (FUZZY
          ((NULL S) NIL)
          ((ATOM (FUZZY S ((FUZZY CAR CDR) S))) NIL))
         (T (CONS (MYMIN S (CAR S))
          (MYSORT (REMOVE (MYMIN S (CAR S)) S))))))))))

((CRISPY '(DEFUN MYSORT (S)
    (COND (FUZZY ((NULL S) NIL) ((ATOM (FUZZY S
((FUZZY CAR CDR) S))) NIL))
     (T (CONS (MYMIN S (CAR S)) (MYSORT (REMOVE
(MYMIN S (CAR S)) S))))))))
```

Figure. The Prototypical T2K GUI

FIGURE 7

SYSTEM OF SYSTEMS AND METHOD FOR SOFTWARE COMPONENT SYSTEM DESIGN AND OPTIMIZATION THROUGH TESTING

FEDERALLY-SPONSORED RESEARCH AND DEVELOPMENT

This invention (Navy Case No. 100,488) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawr.navy.mil.

CROSS-REFERENCE TO RELATED APPLICATIONS

This application is related to US Patent Applications entitled "Graphic User Interface Having Menus for Display of Context and Syntax Useful in an Artificial Intelligence System" (NC 099,109), Ser. No. 12/390,642, filed Feb. 23, 2009, and "Adaptive Case-Based Reasoning System Using Dynamic Method for Knowledge Acquisition" (NC 100,222), Ser. No. 12/755,268, filed Apr. 6, 2010, both of which are assigned to the same assignee as the present application, the contents of both of which are fully incorporated by reference herein.

BACKGROUND

The present invention provides a means and methodology to hedge the scalability problems inherent to conventional code-writing techniques and conventional 3d generation languages. This is to be done by packaging functional software in the form of components—not objects as is currently in vogue. Objects require that their use be preplanned; whereas, components need only be understandable and retrievable to be composed. There have been actual products—first Lisp, then Scheme, and finally Layout. While not the same as this disclosure, nevertheless each of these products has served to show the viability in practice of a component-based approach of the type disclosed herein. Just as gate arrays have supplanted custom ICs where speed is not absolutely critical, so too will component-based software replace custom coding. It is thus vitally important that the military take a renewed look at how they write and verify their complex software products. Much can be improved—including macroeconomic spillover into the civilian sectors.

Related prior methods had inception with machine language, (relocatable) assembly language, 3d, $4^{th}$, and $5^{th}$ generation languages. While the 3d generation languages, which became ubiquitous with the arrival of Fortran, were universal (i.e., unlike the $4^{th}$ and $5^{th}$ generation languages), the Turing language is universal too. The point is that universality says nothing about the ease of programming in them. It follows from the works of Chaitin and Kolmogorov that reuse is the way to hedge complexity while maximally verifying component codes. However, prior methods had relocatable code (macros) for the IBM 360 assembler, which gave way to subroutines in Fortran, and later to methods in Java. However, such approaches do not take advantage of component-based capabilities—from indexing to testing to automated synthesis and CASE tools—it is time to take the next step forward.

SUMMARY

In one embodiment, the present invention is a computer-implemented system for designing software-based components for systems of systems including multiple software-based components saved in a relational database where the functions of each software component are defined by one or more examples of its operation using a natural language. Each software component is assigned a searchable, unique free-text field such that each of the components have multiple indexed levels in a literal restriction path. The system further includes means for retrieval, synthesis, substitution, reuse and modification of the components at every level of the multiple levels, including means for defining a new software component.

In another embodiment, the system includes a query using keyword and/or phrase constraints for searching the relational database and returning a listing of all components in satisfaction of the searched constraints where each component is assigned a unique integer and saved in the relational database with respective hierarchical descriptive ordered pairs representative of the respective operations in the literal restriction path such that the ordered pairs are searched along the literal restriction path.

BRIEF DESCRIPTION OF THE DRAWINGS

Reference is now made to the drawings, where like components are represented by like reference numerals.

DETAILED DESCRIPTION OF THE EMBODIMENTS

An objective of this disclosure is to define a science of design, which allows for the evolution of complex software systems that are capable of fully utilizing massively parallel computers of ever-greater capability. Clearly, any practical science of design should allow the human in the loop to do what he/she does best while at the same time utilize the machine to do what it does best. Such an eminently practical symbiosis is based on the science of randomization as defined by Chaitin, Kolmogorov, Rubin, Solomonoff, and Uspenskii. Here, repetitive or symmetric actions such as testing evolutionary alternatives are carried out by a fast computer, while novel or "random" actions such as that of providing a model or component definition are realized by the human in the loop.

Figure 1:
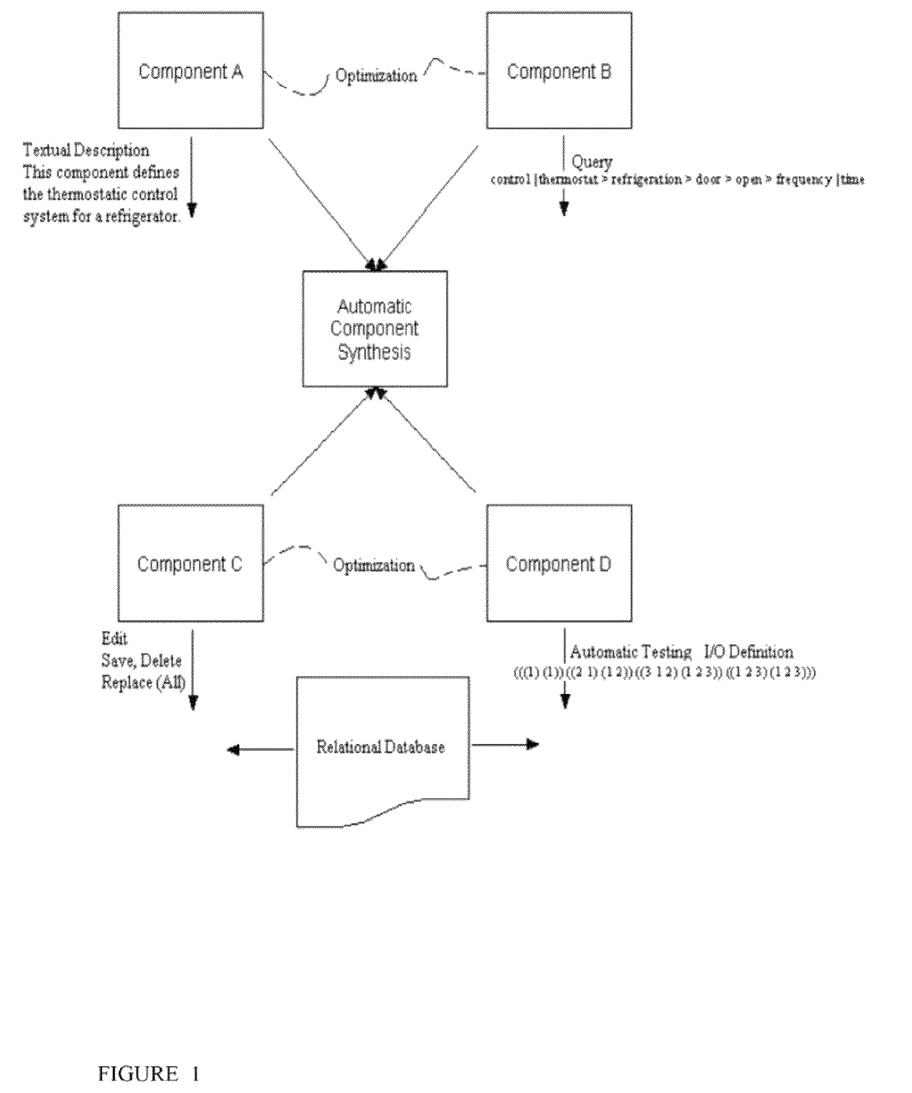
FIG. 1 shows a block diagram of the component system of systems (SoS).

Autonomous behavior may be determined by complex software that is designed by way of computer-assisted complex processes. The key to making this work is to modularize the software into components, which can interact with one another in a similar way that pieces of a puzzle can. Then, software tools are provided to retrieve, store, modify, and test the assemblage of pieces. The more coherent the domain, the more reusable these pieces will be. FIG. 1 shows the interrelationships among these software components and tools.

Applications for autonomous or semi-autonomous vehicles such as the UAVs that support the US military in reconnaissance missions (Predator and the GlobalHawk, for example) or could support our civilian forces using autonomous robot colonies (in rescue missions such as the events surrounding the World Trade Center and the Oklahoma City bombing, or in homeland security, for example) continue to spurn new research and development efforts in intelligent agents, light-weight materials, fuel-cell based propulsion, hybrid engine designs, smart sensor networks, secure wireless communication networks, and energy-efficient computing architectures. Further, with the advent of advances in nanotechnology and microsystems, several research teams continue to investigate the integration of such technologies for small swarms of AVs or SAVs for military, commercial, and civilian applications. Complex software underpins such integration efforts to the tune of about 15 percent of GDP per year. Clearly, we need to devote more attention to the processes by which efficient software may be created to improve the national economy. This disclosure addresses the opportunity to do so for many applications by providing a system and method for designing software components for Systems of Systems (SoSs).

The number of computational devices using embedded software is rapidly increasing and the embedded software's functional capabilities are becoming increasingly complex each year. These are predictable trends for industries such as aerospace and defense, which depend upon highly complex products that require systems engineering techniques to create. We also see consumer products as increasingly relying upon embedded software—such as automobiles, cell phones, PDAs, HDTVs, etc.

Embedded software often substitutes for functions previously realized in hardware such as custom ICs or the more economical, but slower gate arrays; for example, digital fly-by-wire flight control systems have superseded mechanical control systems in aircraft. Software also increasingly enables new functions, such as intelligent cruise control, driver assistance, and collision avoidance systems in high-end automobiles. Indeed, the average car now contains roughly seventy computer chips and 500,000 lines of code—more software than it took to get Apollo 11 to the Moon and back. In the upper-end cars, in which embedded software delivers many innovative and unique features, there can be far more code.

However, the great number of source lines of code (SLOC) itself is not a fundamental problem. The main difficulty stems from the ever-more complex interactions across software components and subsystems. All too often, coding errors only emerge after use. The software testing process must be integrated within the software creation process—including the creation of systems of systems in a spiral development. This follows because in theory, whenever software becomes complex enough to be capable of self-reference it can no longer be formally proven valid.

Figure 2:
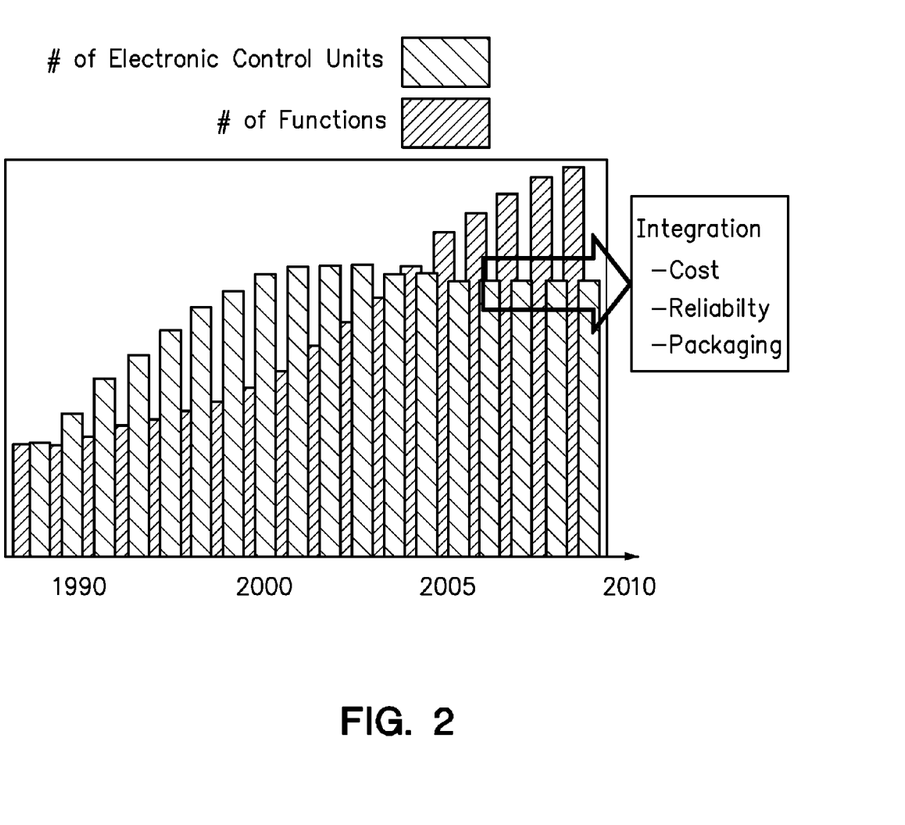
FIG. 2 shows randomization of software components.

Randomization: As software gets more complex, one might logically expect the number of components to grow with it. Actually, the exact opposite is true. Engineers are required to obtain tighter integration among components in an effort to address cost, reliability, and packaging considerations, so they are constantly working to decrease the number of software components but deliver an ever-expanding range of capabilities (see FIG. 2). Such randomization (compression) has an attendant advantage in that it allows for more thorough testing of software components by virtue of their falling on a greater number of execution paths. For example, suppose that one were to synthesize a sort function. This has actually been done by us and appears in FIG. 3. Rather than concern ourselves with such details as, "should I use For i=1 to n−1, or is it n, or is it n+1" and the like, we set up a transformational space of alternative function configurations and enable the computer to uniformly cover the search space subject to such I/O constraints as (((3 2 1) (1 2 3)) ((3 1 2) (1 2 3))). That is, when (3 2 1) is input to the sort function, it is required to output (1 2 3). Similarly, when (3 1 2) is input to it, it is required to output the same (1 2 3).

The goal here is to cover the maximum number of execution paths using the fewest I/O tests (i.e., heuristic validation). Clearly, there is little value is using a test set such as (((1) (1)) ((2 1) (1 2)) ((3 2 1) (1 2 3)) ((4 3 2 1) (1 2 3 4)) . . . ). The problem here is that this test set is relatively symmetric or compressible into a compact generating function. A fixed-point or random test set is required instead and the use of such relatively random test sets is called, random-basis testing. For example, such a test set here is (((1) (1)) ((2 1) (1 2)) ((3 1 2) (1 2 3)) ((1 2 3) (1 2 3))). Many similar ones exist. Notice that the human specifies a schema that can be as qualitatively fuzzy as the computational horsepower will permit. It is certainly easier to specify say, for i=1 to [n−1, n+1] than to be exact (see FIG. 3). Besides, the validity of the complex software, under any design methodology, is only as good as the testing that it undergoes. It's just that using random-basis testing, while the need for functional decomposition remains, the complexity for the designer is shifted from writing code to writing relatively random tests. The complexity of the former grows non-linearly with scale; whereas, the complexity of the latter is essentially linear with scale. Furthermore, the test vectors can be dynamically configured by the context of the problem—leading to the automatic synthesis of control rules. Testing may be applied to everything from the synthesis of components for controlling the operation of a commercial refrigerator (see below) to the design of software for correcting the flight control of an otherwise autonomous helicopter.

Figure 3:
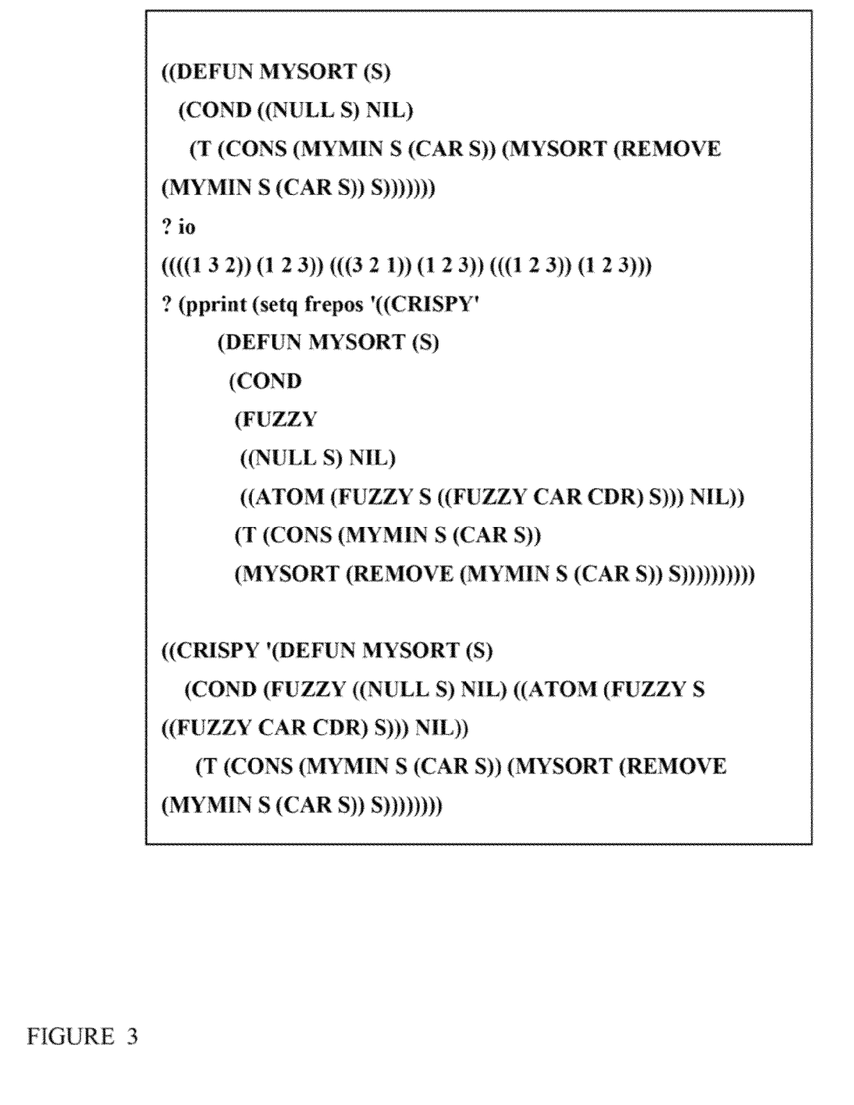
FIG. 3 shows component synthesis by way of testing.

It is to the advantage of a machine to minimize the number of alternatives in any one function (recursively defined)—see FIG. 3. Of course, to do so requires that more knowledge be supplied in the form of schemas a priori. The more powerful and numerous the processors, the less this is a concern all else being held equal. This phenomenon is formally referred to in the numerical analysis literature as the triangle inequality. At the bottom of FIG. 3 we see semantically equivalent, but syntactically distinct definitions for MYSORT. Both functions have the same specified I/O behavior and both are instances of the same "fuzzy" program-writing component.

System intelligence is attained by some combination of two routes (1) through human programming using as high a level language as is practical and (2) through (heuristic) search. This disclosure pertains to (1), while techniques addressing (2) may be found in the literature. Some of the latter techniques may find application in component retrieval.

Control systems are tasked to provide numeric and/or symbolic data feeds to the SoS. All modules in the SoS are hierarchical and composable with all others—including themselves (e.g., for inner loops). This is in line with the principle of information hiding. Their functional and input-output pin definitions are stored in a relational DB. Functional programming allows for the ready definition of massively parallel programs with relative ease and using the following component-based approach, efficiency gains of 1,000 percent or more are possible in comparison with third-generation languages, depending on the degree of reuse experienced. Clearly, bigger and more domain-specific is better. Together, they serve to better enable reuse.

Figure 4A:
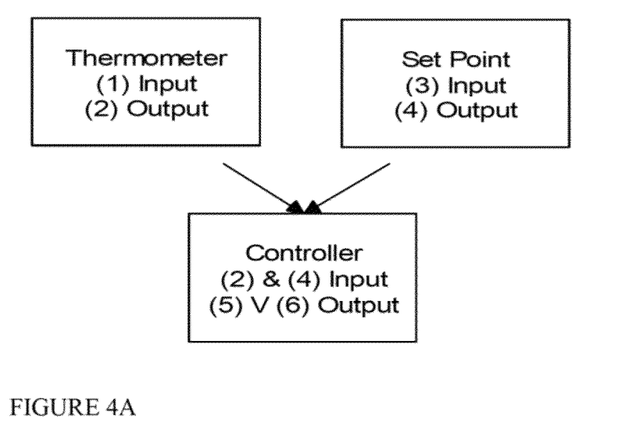
FIG. 4A shows a simple controller component and FIG. 4B shows a component view.
Figure 4B:
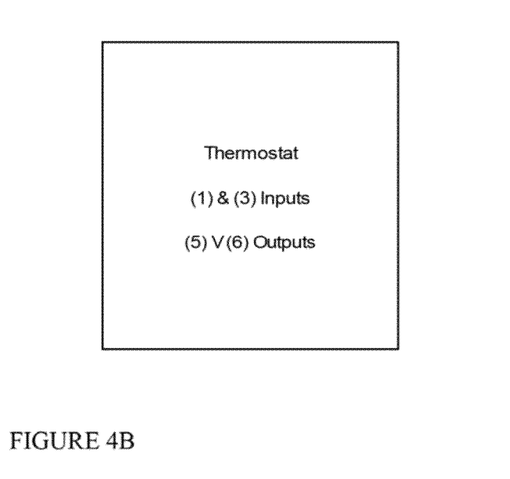

For example, if an SoS were to control a thermostat inside of a refrigerator, then there would be at least three input variables; namely, the current temperature, the desired temperature (set point), and the frequency with which the refrigerator door is being opened and closed (i.e., to conserve energy). The thermometer takes analog input (1) and provides a digital temperature in degrees Fahrenheit as output (2). Similarly, the set point takes an analog or digital setting as input (3) and provides a digital control parameter as output (4). The controller takes (2) and (4) as input and turns the refrigerator on (5) or off (6) as output. We will consider the frequency with which the refrigerator door is being opened and closed subsequently. The components appear in FIG. 4.

The thermostat is assembled using a hierarchical list of all available inputs, which of course may be outputs. The above method is convenient, but what happens as the components grow in complexity? The answer is that they need to be multiply indexed. This means that functional components need to be defined by one or more examples of their actions. In this manner, the user need not understand their inherent complexities of operation. Thus far, components may be indexed by integer, by keyword or phrase, and by example. The idea is to allow for iterative refinement and rapid understanding. All this serves to maximize reuse. Reuse is perhaps the best-known real-world technique for the minimization of program bugs. There can be no theoretical method for insuring absolute validity once the program grows to a level of complexity to be capable of self-reference.

Let us suppose now that the frequency of opening and closing the refrigerator door is to be added in as is customary in a spiral software development. Here, a search is to be made for a component that states something to the effect, IF output=off (6) and frequency of door opening is high THEN output=on (5).

IF output=off (6) and frequency of door opening is low THEN output=off (6).

This description serves as an example. It may be found by keyword search using the following hierarchy or equivalent, control|thermostat>refrigeration>door>open>frequency|time. This defines a search hierarchy, where the vertical lines designate "or" and the ">" point to a subcategory, state, or subcomponent. This example represents an attempt to retrieve a component(s) from the database, which deals with a refrigerator door that has been left open for some minimal amount of time. We will call this component a rectifier (of sorts) and it is custom programmed and inserted into the component database if not found there. It appears in FIG. 5.

Figure 5:
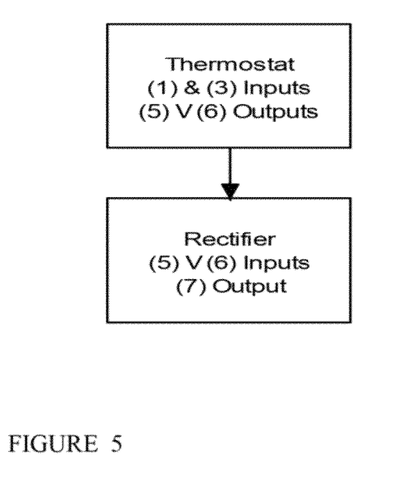
FIG. 5 shows a rectified controller component.
Figure 6:
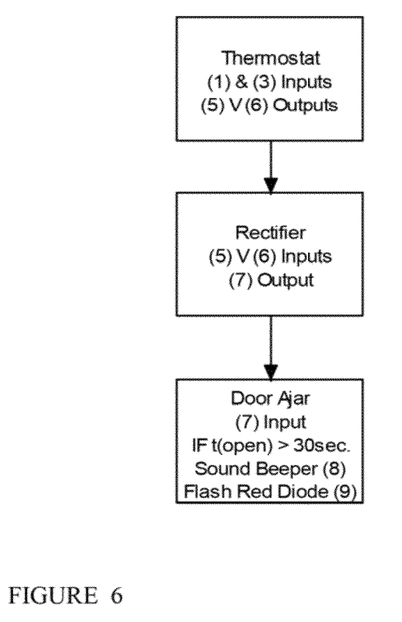
FIG. 6 shows an improved rectified controller component.

FIG. 5 is defined as a new component and indexed as previously described. Next, as previously stated, this nontrivial component cannot be assured to be valid. For example, suppose that there is too much food in the refrigerator so that its door does not close. The result of the rectifier will be that the output is always on—clearly an error. It is desired instead that a beeper sound and a red diode flash (e.g., after being continuously held open for say 30 seconds or more). FIG. 6 presents the updated result, where (8) and (9) are understood to be outputs.

There is usually no reason to dispose of the old component. Rather, save the update(s) with augmented descriptions and keywords and leave the old one resident in the database. Next, the database system will (when enabled) search the design(s) for the component of FIG. 5 and where found ask the programmer if he or she wishes to replace this one or all of the components in the local component view, defined by FIG. 5, by that defined by FIG. 6. The system checks that no input state is altered by doing this and if so flags the user for approval. Such defines CASE or computer-assisted software engineering.

The key to increasing programmer productivity is reuse and software automation. Neither contemporary programming languages nor their environments support this concept to any significant extent. Furthermore, software designs are readily modified through the retrieval and customization of their constituent components. Such retrieval and customization also finds use in manual optimization (e.g., replacing an $O(n^2)$ Bubblesort with an $O(n \log n)$ Quicksort component for $n>21$. FIG. 6 shows a view of the improved rectified controller component.

Next, there is a need to evolve automatic test suites, but only to insure that any code augmentation or deletion leaves it no worse off than before. Test vectors are simply sets of <input, output> pairings designed to maximally cover the execution paths, as described above. Test vectors may also be stored with each indexed component to facilitate the programmer in their creation as well as with the overall understanding of the components function. While increasing the number of software tests is generally important, a domain-specific goal is to generate mutually random ordered pairs [6], [10]. A previous example showed how to use such a test vector to verify a sort routine.

Given a test suite, it is possible to automatically synthesize a more or less optimal component-based functional program that is in satisfaction of this suite (e.g., see FIG. 3 for an example using the LISP programming language). There are some details such as knowing when a particular sequence will lead to a stack overflow, but these are easily resolved using an allowed execution time parameter and impressive programs have been so synthesized—supporting the component-based concept. Notice that components can be written at any scale—from primitive statements to complex functions. Given only so much allocated search time, the system will either discover a solution or report back with failure. This is in keeping with the recursive unsolvability of the Halting Problem.

The SoS Algebraic Definition

Definition 1: Component

Define a component, C, to map zero or more inputs to an output. That is, O=C (I). In practice, I represents a vector of inputs; although, in theory it may be a single number, which follows from the use of pairing and projection functions.

Definition 2: Composition

Define a composition of components, C, to form a macro component as follows. Here the outputs of the internal components serve as inputs for the containing components. Thus, $C_{i+k+1}^{j+1}=c_{i+k}^{j}(c_i^j, c_{i+1}^j, \ldots, c_{i+k-1}^j)$, where the subscript identifies the component and the superscript indicates the relative level of the component. In this definition, every distinct component has a distinct lower subscript.

Definition 3: Recursion

A component is said to be recursive if and only if $C_i^{j+1}=c_i^j$. It has been proven that recursion and iteration are theoretically equivalent in that every recursive program has an iterative equivalent and vice versa. This defines the self-composable components mentioned above.

Theorem 1: Universality

Every program is either a primitive component or is realizable by a hierarchical composition of primitive components.

Proof.

Assume that every domain is associated with a primitive set of components such that every program that can be written in that domain can in principle be written entirely using primitive components. Modify one of those components to include the do-nothing begin-end pair component. This realizes the same function and the theorem follows.

Theorem 2: Compaction

The more symmetric the domain, the greater the potential for compaction. Conversely, the more random the domain, the less this potential compaction. Note that it follows from the unsolvability of the minimization problem that no non-trivial program can ever be proven to be minimal.

Proof.

Consider the sequence of instructions defined by, a a a a . . . . Clearly, this is a domain of ultimate symmetry and can be realized using ceil ($\log_x$ |a a a a . . . |) components, where x>1 and represents the number of instructions per component. Here, a minimal definition occurs where $x=\lceil \sqrt{|aaa...|} \rceil$. Conversely, consider the sequence of instructions defined by, a b c d . . . . Clearly, this is a domain of ultimate randomness and cannot be further compressed into components.

Remark 1:

It follows from the unsolvability of the minimization problem that there can be no perfect method for indexing and retrieving components for if there could a contradiction would arise. Rather, heuristic methods for indexing, specifying, and defining a component(s) are inherently necessary. As a consequence of this, we turn our attention next to the development of a mechanics for the same.

On a Mechanics for Component Synthesis and Use:

As previously mentioned, most aspects of component retrieval, synthesis, and use are inherently heuristic. Here, we argue for one such realization, while it is clear that such realizations are strictly recursively enumerable—not recursive. In other words, one cannot disprove the existence of a better methodology—only enumerate it if and when found. Arguments thereof will be presented at as high a level as is practical and details, which one having ordinary knowledge in the field can autonomously realize will usually be omitted. Theoretical appeals are made to Church's Thesis, which states that any algorithm that can be unambiguously specified can be reduced to practice (computer code). All this serves the goal of supporting a maximally general set of claims.

What follows is a listing of methods that work in conjunction with a relational database(s) to provide all manner of assistance in the retrieval, synthesis, substitution, and modification of components at every level. An outline follows, corresponding to the block diagram shown in FIG. 1.

Textual definition
    Query capability using keywords and/or phrases
    Functional I/O definition
    CASE Tools
        Edit functions
            Save, Delete
            Replace (All)
        Optimization
        Automatic Testing
        Automatic Component Synthesis Textual definition (description): The function of any software component (such as Component A in FIG. 1) can be described using natural language—possibly augmented with figures, tables, images, and the like. Every component saved in the database is assigned a free-text field. This field is searchable using an editor-based search for keywords, phrases, and Boolean combinations. The user may also define Boolean combinations of keywords and phrases, which may not be present in any returned component.

Figure 7:
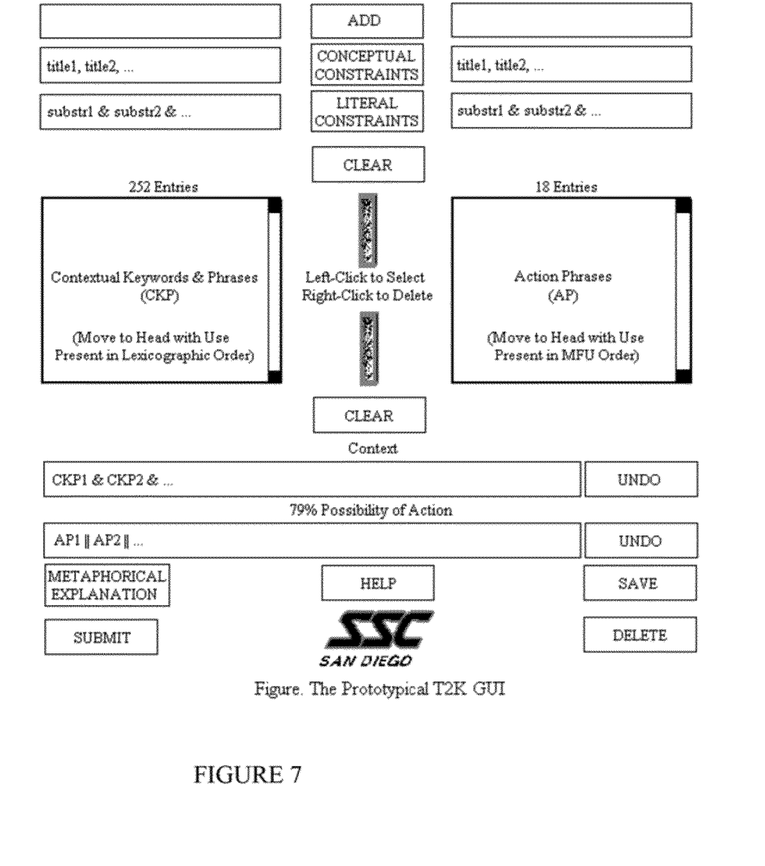
FIG. 7 shows a sample user interface.

FIG. 7 depicts a realized GUI for associative retrieval. Here, in addition to literal constraints on the sought text as previously described, one can effect conceptual constraints as well. Such constraints function as an associative memory. For example, "computer" and "food" are two very different conceptual constraints on "apple". The conceptual constraint, "computer" would have been added in the 1980s subsequent to the release of the "Apple McIntosh". Note that "computer", but not "food" is a conceptual constraint on "Apple". Refer to above cross-referenced patent application entitled "Graphic User Interface Having Menus for Display of Context and Syntax Useful in an Artificial Intelligence System" (NC 099,109) for further details. In summary, free text can be a powerful ally in the directed search for domain-specific components.

Query capability (Component B in FIG. 1) using keywords and/or phrases: The concept here is to restrict the appropriate relational field using a word or phrase sequence and return a list of all components in satisfaction of the constraints, if any. All restrictions are assumed to be literal exact matches; but, the above cross-referenced patent application entitled "Adaptive Case-Based Reasoning System Using Dynamic Method for Knowledge Acquisition" (NC 100,222) may be inserted to all enable the system to learn to properly process more or less metaphorical, or to a limited degree, previously unseen restrictions in context. Consider a hypothetical refrigerator door, which is assigned a unique integer and saved in a relational database along with the following hierarchical descriptive ordered pairs, among others, for use in indexing; namely, (thermostat, refrigeration) (refrigeration, door) (door, open) and (open, time). Some ordered pairs, like (thermostat, door), would never occur because they do not make sense.

Consider again, the literal restrictions:

| control | thermostat | > | refrigeration | > | door | > | open | > | frequency | time |
|---------|------------|---|---------------|---|------|---|------|---|-----------|------|
| 1       |            |   | 2             |   | 3    |   | 4    |   | 5         |      |

The following procedure is executed for each component in the database. The ordered pairs are searched to find how far to the right in the literal restriction path is attained, where a single member of a disjunction suffices for inclusion on the path—that is, (control, refrigeration) or (thermostat, refrigeration); (open, frequency) or (open, time)—see above. Components are returned in descending order of how well they match the descriptive pairs. Thus, components matching all five are followed by those matching the first four, followed by those matching the first three, . . . , followed by those matching the first one only. The level of match is also returned with the component. This is because the user may wish to modify a symmetric level four component to create one that is needed, while they may wish to start from scratch if a level one component is the best that can be had at present. In the latter case, the level one component is said to be random relative to the user's present needs. The number of components returned is under user control and may be listed for the user before presenting the results of the query. In said manner, the user can test out refinements of the query, as necessary.

Functional I/O definition: Each component (such as Component D in FIG. 1) saved in the database is associated with one or more tests that serve to map a random input vector to the correct output vector. For example, it may be difficult to describe the function of a sort program in words, specify it using literal or associative restrictions, or otherwise be able to conceptualize it. However, the above I/O specification vector, (((1) (1)) ((2 1) (1 2)) ((3 1 2) (1 2 3)) ((1 2 3) (1 2 3))), leaves little doubt as to its function. Functional I/O definitions are especially useful in combination with other constraint specification methodologies. For example, one may also want to know if this is insertion sort, Quicksort, merge sort, etc. (e.g., to determine its order of magnitude). Functional I/O definitions also serve as repositories to use for test data in developing SoS test cases—see Automatic Testing below.

A second form of I/O definition is the I/O specification rule. The difference between a vector-based and a rule-based approach is that the former is defined by code, which is otherwise lacking in domain-specific knowledge; whereas, the latter is domain-specific knowledge. Two previously seen I/O specification rules follow.

IF output=off (6) and frequency of door opening is high THEN output=on (5).
IF output=off (6) and frequency of door opening is low THEN output=off (6).

I/O specification rules also differ from I/O specification vectors in that the I/O rules are not for testing systems and SoSs, but rather directly for use in component construction (FIG. 5).

CASE Tool Edit functions (Save, Delete-such as Component C in FIG. 1): Relational databases of virtually unlimited size (limited mainly by the width of the address bus) can be constructed using RAM memories. New components are entered in a given database through the use of the Save command. Similarly, they are permanently removed using the Delete command. Modified components overwrite their source—including all associated descriptive and functional I/O material that has also been updated. Thus, the delete command is rarely used.

CASE Tool Edit functions (Replace (All)): Sophisticated Find commands have been constructed (e.g., see FIG. 7). Other aspects of the Find command have been covered above under the headings of, "textual definition" and, "query capability using keywords and/or phrases". Here, we turn our attention to the Replace or the Replace All command. The essential concept here is to replace a targeted component(s) with an indicated one(s). Replacement can be performed by unique identifier, by unique name, and/or by way of having been selected using a mouse. A straightforward GUI can then be used to perform the desired substitutions. Component substitutions should be followed by integration testing using defined I/O specification vectors, which may or may not need to be manually tailored to properly utilize the new I/O specification vectors brought in by the substitution(s). Further CASE tools may provide user assistance with this task. In any event, manual intervention may be required. Finally, the CASE tools, which serve this component-based system, may be bootstrapped using the components as they are developed. Such is the basis for a truly intelligent design.

CASE Tool Optimization: The idea underpinning optimization is to update conceptual straightforward component assemblies with more time/space efficient ones, which generally are not as straightforward in their workings. For example, insertion sort consists of two primary components: the first one finds the minimum element in a vector, while the second component swaps this element successively with the first, second, ... element in the list. The net result is an $O(n^2)$ algorithm for iteratively moving the minimal element to the top of the list. The two constituent components are quite straightforward. Unfortunately, their performance is unacceptable for n>21 data elements. An $O(n \log n)$ (e.g., Quicksort) component is said to optimize the insertion sort component(s) when it substitutes for them (including all associated descriptive and functional I/O material).

CASE tools exist for measuring component execution time and spatial requirements. Optimization may be achieved by combining these tools and manual and/or automatic search for component substitution(s) with the aforementioned replace (all) command.

CASE Tool Automatic Testing: I/O specification vectors are local to each component. They insure that to the extent practical every component, no matter how changed, remains immutable in its I/O characterization (i.e., unless that is manually changed as well). The way this works is that each component has an input vector holding bin as well as an output vector holding bin. Whenever a component-based SoS is run, the output bins feed the input bins to which they are connected. The component will only produce outputs for those inputs, which are found in its specification vector. Then, the system of components will iteratively proceed until (a) it halts; (b) it cycles (detectable through state repetition or a maximal allowed run-time timer); or (c) the user changes the I/O specification vector for at least one component, which requires a re-start of the test for the component and for each successive outermost contained level.

CASE Tool Automatic Component Synthesis (FIG. 1): FIG. 3 contains some of the actual LISP code used to prove that automatic component synthesis is practical. In this example, a PC was able to randomly select program parameters in order that code schemas could be instantiated to conform to a supplied I/O specification vector. It is interesting to note that the system found many equally valid syntactic programs having the same semantics. Here, synthesis and testing fuse to become one and the same because we judge a programs validity on the basis of test results, which just happens to be the same results used to synthesize it. How can the synthesized program be anything but valid, where found?

There are several problems and ways to counter these problems in the course of automatic synthesis. First, the presence of deleterious cycles, too little memory and/or stack space, and the like is handled as previously described. Second, slow downs in synthesis is handled by (a) parallel processing the synthesis, (b) making use of the triangle inequality (i.e., minimizing the parameter space for each component at each level), and most significantly (c) apply knowledge to delimit the search space. This last one also serves (b) as follows. Suppose for example one knows that x and y may not be of the same sign. This one fact can halve the search space for a solution within a component schema. More generally, if one knows that n variables may not be of the same sign, then the search space is reduced by a factor of $2^{n-1}$. Such savings grow exponentially and multiplicatively. Clearly then, there can be no substitute for (c).

Again, there can be no one best method for achieving automatic component synthesis—save that it must respect processes (a), (b), and (c). Knowledge can be literally represented using a rule-based approach as described above, and/or that knowledge can be latent through the use of the triangle inequality in the design of the schemas themselves. Given that automatic testing has been designed for above, it is only logical that the next step be automatic functional program synthesis. Again, our initial experiments have met with success here. It is also clear that synthesized components are an instance of a type of knowledge representation. Thus, it follows that an SoS and method for control system design and optimization through testing can evolve to ever-greater complexity given the computational resources to support it. Here is where hardware, software, randomization, reuse, symmetry, knowledge, and testing (among some lesser disciplines) all fuse into one concept; namely, that of evolutionary design.

New features of the present invention include, but are not necessarily limited to:
Is practical for functional software design
Provides for an economy of scale of developers
Allows for automatic component synthesis by way of fitting specified test vectors Provides for storage and retrieval of components from a (distributed) relational database Components serve to reduce design and implementation time Components facilitate reuse Reuse maximizes component tests, which decreases likelihood of errors Allows for placeholder components, which may be subsequently optimized Allows for parallel computation Allows for parallel development by independent developers Allows for the bootstrapping of CASE tools Incorporates intelligent or very-high-level editor functions Allows for multiple indices to the component definitions Allows for associated textual descriptions Allows for Unix-like hierarchical queries Allows for automatic testing Some or all of the steps of the present invention may be stored on a computer readable storage medium, wherein the steps are represented by computer readable programming code. The steps of the method may also be computer-implemented using a programmable device, such as a computer-based system. The method may comprise instructions that, when loaded into a computer-based system, cause the system to execute the steps of the method. The method may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

From the above description, it is apparent that various techniques may be used for implementing the concepts of the present invention without departing from its scope. The described embodiments are to be considered in all respects as illustrative and not restrictive. It should also be understood that system is not limited to the particular embodiments described herein, but is capable of many embodiments without departing from the scope of the claims.

What is claimed is:

1. A computer-implemented system for designing software-based components for systems of systems where the systems of systems consist of components that are themselves systems, the computer implemented system comprising:

multiple software-based components saved in a relational database where the functions of each software component are defined by one or more examples of its operation using a natural language and where each software component is assigned a searchable, unique free-text field such that each of the components have multiple indexed levels in a literal restriction path;

and a processor and memory, the processor and memory controlling retrieval, synthesis, substitution, reuse and modification of the components in the relational database at every level of the multiple levels, including means for defining a new software component, including functional I/O definitions where each component saved in the relational database is associated with one or more tests that serve to map a random input vector to a correct output vector; where the I/O definitions includes I/O specification vectors for testing the systems of systems; where the I/O definitions includes I/O specification rules for component construction and including I/O specification vectors which are local to each component and where each component has an input vector holding bin and an output vector holding bin and where the output bins feed the input bins to which they are connected so that a component will only produce outputs for those respective inputs which are found in its respective specification vector.

2. The system of claim 1 including a query using keyword and/or phrase constraints for searching the relational database and returning a listing of all components in satisfaction of the searched constraints where each component is assigned a unique integer and saved in the relational database with respective hierarchical descriptive ordered pairs representative of the respective operations in the literal restriction path such that the ordered pairs are searched along the literal restriction path.

3. The method of claim 2 where a single member of a disjunction suffices for inclusion on the literal restriction path.

4. The system of claim 3 where searched components are returned in descending order of how the descriptive pairs are matched along with the level of match.

5. The system of claim 1 including a CASE (computer-assisted software engineering) tool with an edit command.

6. The system of claim 1 including a CASE tool with save and delete commands.

7. The system of claim 1 including a CASE tool with replace and replace all commands.

8. The system of claim 1 including a CASE optimization tool for measuring component execution time and spatial requirements.

9. The system of claim 8 including a CASE automatic testing tool.

10. The system of claim 1 including a CASE automatic component synthesis tool.

11. The system of claim 10 where the CASE synthesis tool provides for parallel processing the component synthesis.

12. The system of claim 11 including using a triangle inequality.

13. The system of claim 12 including the application of knowledge to delimit the search space.

14. A computer-implemented method for designing software-based components for systems of systems comprising:

saving multiple software-based components saved in a relational database where the functions of each software component are defined by one or more examples of its operation using a natural language and where each software component is assigned a searchable, unique free-text field such that each of the components have multiple indexed levels in a literal restriction path; and retrieval, synthesis, substitution, reuse and modification of the components in the relational database at every level of the multiple levels, including defining a new software component, including functional I/O definitions where each component saved in the relational database is associated with one or more tests that serve to map a random input vector to a correct output vector; where the I/O definitions includes I/O specification vectors for testing the systems of systems; where the I/O definitions includes I/O specification rules for component construction and including I/O specification vectors which are local to each component and where each component has an input vector holding bin and an output vector holding bin and where the output bins feed the input bins to which they are connected so that a component will only produce outputs for those respective inputs which are found in its respective specification vector.

15. In a non-transitory computer-readable storage medium represented by a computer-readable programming code, the method comprising the steps of:

saving multiple software-based components saved in a relational database where the functions of each software component are defined by one or more examples of its operation using a natural language and where each software component is assigned a searchable, unique free-text field such that each of the components have multiple indexed levels in a literal restriction path; and retrieval, synthesis, substitution, reuse and modification of the components in the relational database at every level of the multiple levels, including defining a new software component, including functional I/O definitions where each component saved in the relational database is associated with one or more tests that serve to map a random input vector to a correct output vector; where the I/O definitions includes I/O specification vectors for testing the systems of systems; where the I/O definitions includes I/O specification rules for component construction and including I/O specification vectors which are local to each component and where each component has an input vector holding bin and an output vector holding bin and where the output bins feed the input bins to which they are connected so that a component will only produce outputs for those respective inputs which are found in its respective specification vector.

\* \* \* \* \*